United States Patent
Contreras et al.

(10) Patent No.: US 9,129,660 B2
(45) Date of Patent: Sep. 8, 2015

(54) TRANSDUCER RESISTOR SHUNT STRUCTURE FOR LOW-COST PROBING

(71) Applicant: HGST Netherlands B.V., Amsterdam (NL)

(72) Inventors: John T. Contreras, Palo Alto, CA (US); David Patrick Druist, Santa Clara, CA (US); Edward Hin Pong Lee, San Jose, CA (US); David John Seagle, Morgan Hill, CA (US); Darrick Taylor Smith, San Jose, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 41 days.

(21) Appl. No.: 14/096,725

(22) Filed: Dec. 4, 2013

(65) Prior Publication Data

US 2015/0154992 A1    Jun. 4, 2015

(51) Int. Cl.
G11B 33/14    (2006.01)
G11B 5/39     (2006.01)
G11B 5/60     (2006.01)

(52) U.S. Cl.
CPC .......... *G11B 33/1493* (2013.01); *G11B 5/6094* (2013.01); *G11B 5/3909* (2013.01); *G11B 2005/3996* (2013.01); *Y10T 29/49041* (2015.01); *Y10T 29/49046* (2015.01); *Y10T 29/49048* (2015.01)

(58) Field of Classification Search
None
See application file for complete search history.

(56) References Cited

U.S. PATENT DOCUMENTS

| | | | |
|---|---|---|---|
| 6,261,165 B1 | 7/2001 | Lackey et al. | |
| 6,728,067 B2 | 4/2004 | Crawforth et al. | |
| 7,206,172 B2 | 4/2007 | Ding et al. | |
| 7,536,773 B2 | 5/2009 | Stipe | |
| 7,564,110 B2 | 7/2009 | Beach et al. | |
| 8,165,709 B1 | 4/2012 | Rudy | |
| 8,291,743 B1 | 10/2012 | Shi et al. | |
| 8,351,162 B2 | 1/2013 | Etoh et al. | |
| 2007/0133131 A1* | 6/2007 | Biskeborn | 360/323 |
| 2008/0221981 A1* | 9/2008 | Biskeborn | 705/14 |
| 2012/0243125 A1 | 9/2012 | Albrecht et al. | |

OTHER PUBLICATIONS

I.R.McFadyen et al.: "State-of-the-Art Magnetic Hard Disk Drives"; MRS Bulletin, vol. 31, May 2006; 5 pages.
Veeco Instruments Inc.; "Optium ASL 200 Lapping System" retrieved from the Internet: http://www.veeco.com/products/lapping-dicing-systems/optium-als-200.aspx; 1 page, May 14, 2013.

* cited by examiner

Primary Examiner — Craig A. Renner
(74) Attorney, Agent, or Firm — Patterson & Sheridan, LLP

(57) ABSTRACT

Embodiments described herein generally relate to resistive shunt design in a read sensor for providing accurate measurements from an electronic lapping guide (ELG). More specifically, embodiments described herein relate to a transducer resistor shunt structure for low cost probing. A bleed resistor network for a read sensor may comprise one or more first resistors arranged in parallel with one another and a second resistor arranged in series with the one or more first resistors. The resistor arrangement may require a small physical area and reduce or prevent ELG measurement errors.

20 Claims, 5 Drawing Sheets

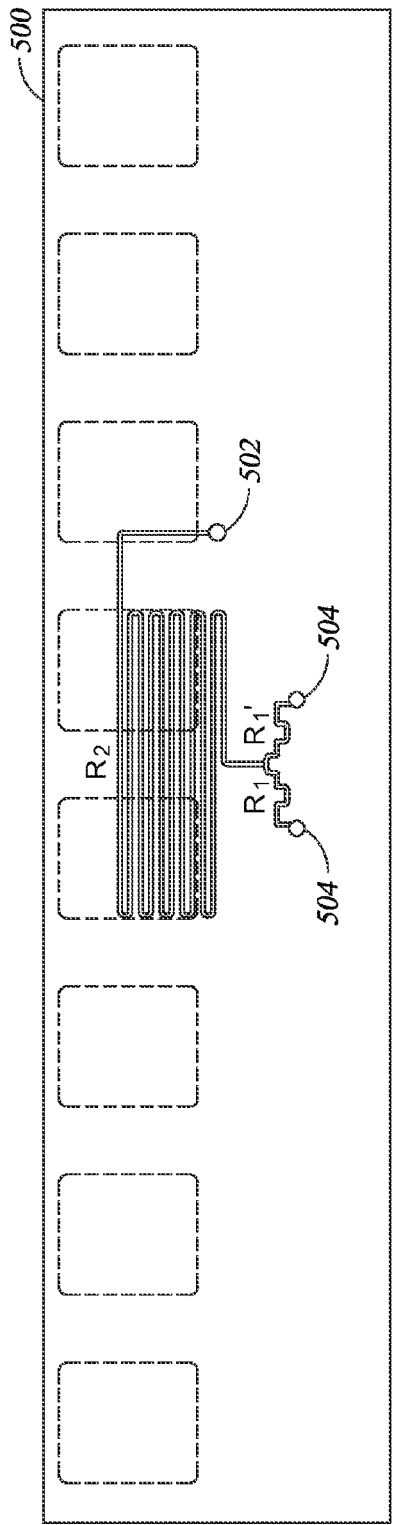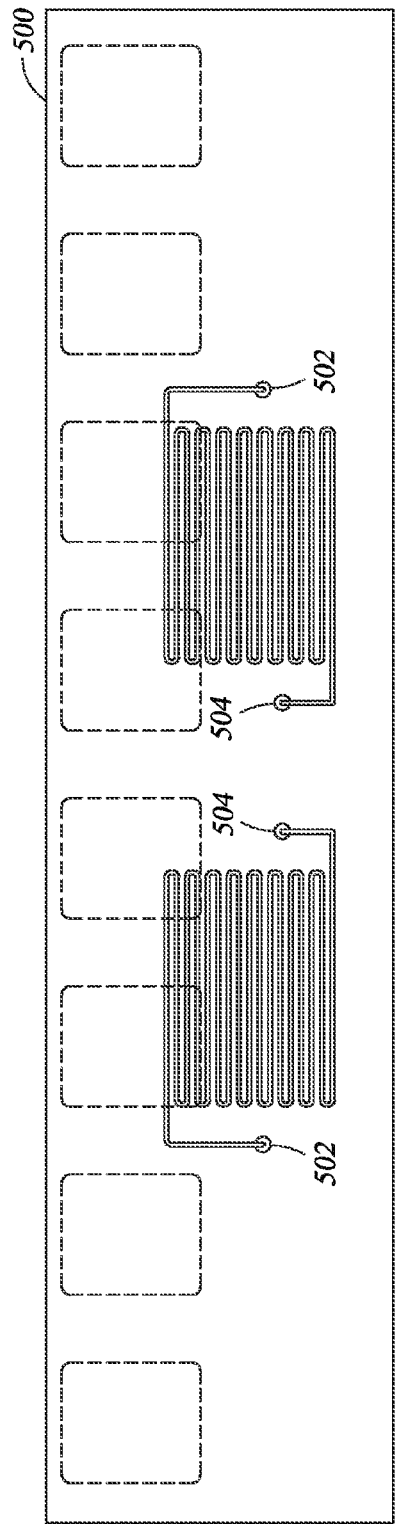
Fig. 5A
Fig. 5B (PRIOR ART)

TRANSDUCER RESISTOR SHUNT STRUCTURE FOR LOW-COST PROBING

BACKGROUND OF THE INVENTION

1. Field of the Invention

Embodiments of the present invention generally relate to using electronic lapping guides to set a read sensor's stripe height, or more specifically, to increasing shunt resistance when monitoring the electronic lapping guides.

2. Description of the Related Art

A typical magnetoresistive (MR) read head includes an MR read sensor, which is located between first and second shield layers. When the read sensor is subjected to positive and negative signal fields from tracks on a rotating magnetic disk in a disk drive, the resistance of the read sensor changes. These resistance changes cause potential changes in a sense current flowing through the read sensor, which are processed as playback signals by processing circuitry.

The read sensor has an exterior surface that faces the rotating magnetic disk and is supported on an air bearing from the rotating disk. This exterior surface is referred to as an air bearing surface (ABS). The read sensor has a back edge that is recessed in the read head opposite the air bearing surface. During fabrication, the ABS is defined so that the read sensor has a precise stripe height—i.e., the distance between the ABS and the back edge. This is accomplished by lapping (grinding) a wafer on which the MR head is constructed until the desired stripe height is achieved.

One technique for determining whether the read sensor has the desired stripe height involves transmitting a current through the read sensor and measuring the change in resistance as the ABS is lapped. However, the materials of the read sensor may introduce noise into the current that makes this technique unreliable. Instead, an electrical element called an electronic lapping guide (ELG) may be fabricated on the read head proximate to the read sensor. Moreover, the ELG may be made of similar materials and have similar dimensions as the read sensor. For example, the ELG may be formed in the same photo and subtractive processes as the read sensor to make the elements co-planar. Thus, as the ABS is lapped, the dimensions of the ELG and the read sensor are affected in a similar manner. Moreover, the materials of the ELG may be selected such that a current flowing through the ELG reliably indicates the changing resistance as the lapping process grinds the ABS—i.e., the ELG, when lapped, generates a signal with less noise relative to the read sensor. The resistance of the ELG may be correlated with a particular stripe height. Once the resistance that correlates to the desired stripe height is achieved, the lapping is stopped. Because of the shared physical dimensions of the ELG and the read sensor, a read sensor proximate to the ELG is assumed to have the same stripe height as the ELG.

An ELG may further comprise probe contacts for precise control and measurement of the lapping process. As structures are becoming increasingly smaller, probing the ELG pads becomes problematic as the ELG and transducer pads are present in increasingly reduced dimensions. Due to physical size limitations, bonding of the ELG often inadvertently contacts the component pads. If a read pad is in contact when probing the ELG pad and the read transducer has resistive shunts to the system ground, errors in the ELG measurements may result.

A known solution is to increase the read transducer's shunt resistance. However, the materials used to cause the increase in the resistor shunt layout occupy an extremely large portion of the slider area and are impractical to implement as there is a desire for increasingly smaller devices. Another solution may be to user higher-cost probe connections that support a finer pitch/spacing resolution such that probing both the ELG pad and another pad is not possible. However, this solution is generally more expensive to implement, and thus, generally undesirable.

Therefore, what is needed in the art is a transducer resistor shunt structure for reliable and low cost probing.

SUMMARY OF THE INVENTION

Embodiments described herein generally relate to ELG's and associated probing contacts. More specifically, embodiments described herein relate to a transducer resistor shunt structure for low cost probing.

In one embodiment, a bleed resistor network for a read sensor is provided. The bleed resistor network may comprise two first resistors in parallel with one another, wherein each of the first resistors have a substantially equal impedance of greater than about 5 KOhms and a second resistor arranged in series with the two first resistors, wherein the second resistor has an impedance of greater than about 250 KOhms.

In another embodiment, a device is provided. The device may comprise a substrate and a plurality of read heads disposed on the substrate. A first one of the plurality of read heads may comprise a read sensor having a bleed resistor network comprising two first resistors in parallel with one another, wherein each of the first resistors have a substantially equal impedance of greater than about 5 KOhms and a second resistor arranged in series with the two first resistors, wherein the second resistor has an impedance of greater than about 250 KOhms. An electronic lapping guide (ELG) may also be provided. The ELG may be configured to indicate, based on a resistance of the ELG, a stripe height of the read sensor.

In yet another embodiment, a system is provided. The system may comprise a substrate comprising a plurality of read heads. Each read head may comprise a read sensor configured to sense data stored in a magnetic media. A bleed resistor network of the read sensor may comprise two first resistors in parallel with one another, wherein each of the first resistors have a substantially equal impedance of greater than about 5 KOhms and a second resistor arranged in series with the two first resistors, wherein the second resistor has an impedance of greater than about 250 KOhms. An ELG may be configured to indicate, based on a resistance of the ELG, a stripe height of the read sensor. The ELG may be electrically coupled to the substrate. A bonding pad may be electrically coupled to the ELG. The bonding pad, ELG, and the substrate may be part of a current path permitting current to flow through the ELG. A lapping unit may be configured to simultaneously lap an air bearing surface on the plurality of read heads. The substrate may be mounted on the lapping unit. A lapping controlled may be electrically coupled to the bonding pad and the substrate. The lapping controller may be configured to measure the resistance of the ELG using the current path and transmit instruction to the lapping unit based on the measured resistance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 illustrates a disk drive system, according to certain embodiments described herein.

FIGS. 5A and 5B are schematic illustrations of bleed resistor networks for ELG connections.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
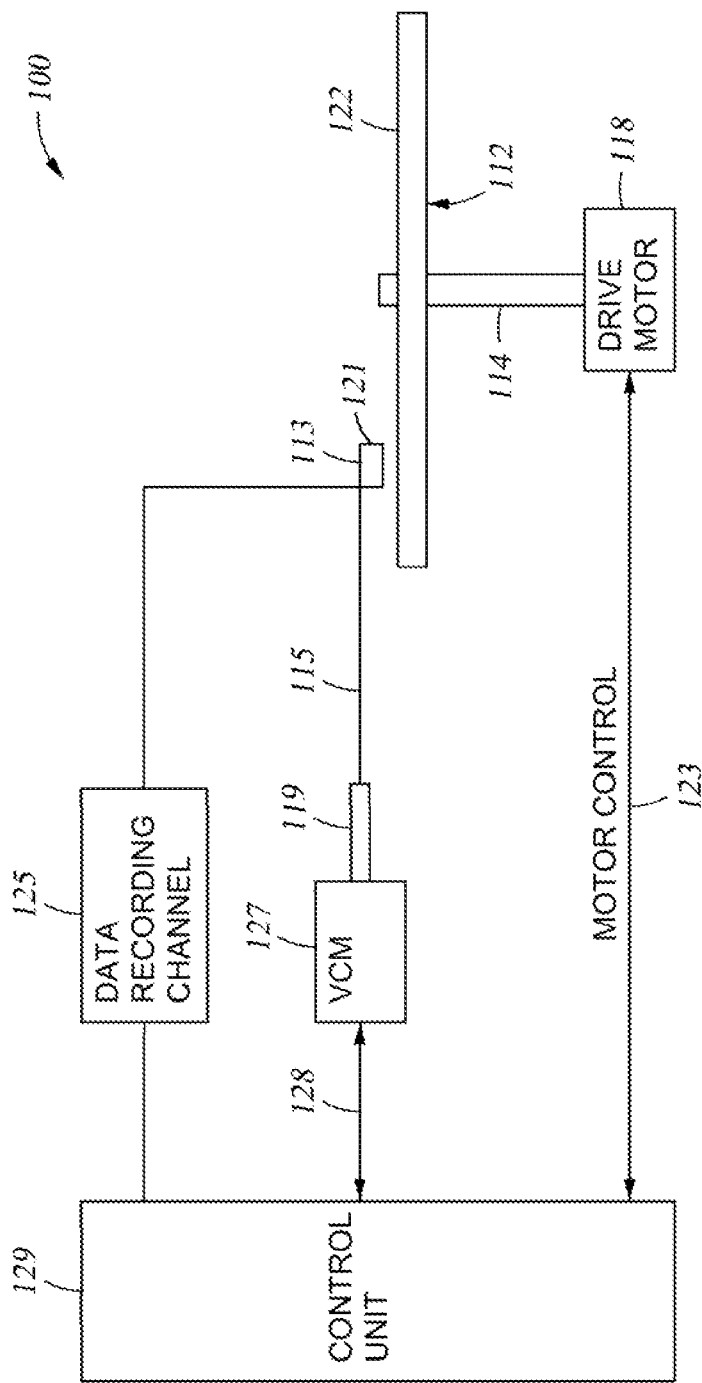

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments described herein generally relate to resistive shunt design in a read sensor for providing accurate measurements from an ELG. When lapping the ABS of a read head (or a plurality of read heads), the electrical resistance of the ELG is used to adjust the lapping process and set the stripe height for a read sensor in the read head. Specifically, as an exterior surface of the ELG at the ABS is lapped, the resistance of the ELG increases. Once the resistance corresponds to the desired stripe height—i.e., the distance between the ABS and the back edge of the read sensor—the lapping process is stopped. To measure the electrical resistance of the ELG, a lapping controller may be wire bonded to at least one pad on the read head that electrically connects the controller to the ELG. In addition to being connected to the pad, the ELG is electrically connected to an electrically conductive substrate on which the read head is disposed. The substrate may be used as a common ground for the current that flows through the bond pad and the ELG.

Because many read head fabrication techniques lap a plurality of read heads simultaneously, each ELG in the read heads may be electrically coupled to the substrate—i.e., share the same ground plane. The lapping controller is then wire bonded to the individual ELGs via respective pads, but the controller is connected to the substrate only at a few locations. For example, the lapping controller may be wire bonded to thirty ELGs in a row of read heads but only have one or two electrical connections to the conductive substrate. The resistances of each of the connected ELGs can be monitored by sweeping through the different wire bond connections. In contrast, if a shared common ground is not used (i.e., current does not flow through the substrate) the lapping controller couples to two pads per read head in order to measure the resistance of the ELG. When using a shared ground connection to the substrate, however, the lapping controller may be connected to only one bond pad for each ELG of interest.

FIG. 1 illustrates a disk drive 100 according to certain embodiments described herein. As shown, at least one rotatable magnetic disk 112 may be supported on a spindle 114 and rotated by a disk drive motor 118. The magnetic recording on each disk may be in the form of annular patterns of concentric data tracks (not shown) on the magnetic disk 112.

At least one slider 113 may be positioned near the magnetic disk 112, each slider 113 supporting one or more magnetic head assemblies 121. As the magnetic disk 112 rotates, the slider 113 moves radially in and out over a disk surface 122 so that the magnetic head assembly 121 may access different tracks of the magnetic disk 112 where desired data is written. Each slider 113 may be attached to an actuator arm 119 by way of a suspension 115. The suspension 115 may provide a slight spring force which may bias the slider 113 against the disk surface 122. Each actuator arm 119 may be attached to an actuator 127. The actuator 127, as shown in FIG. 1, may be a voice coil motor (VCM). The VCM comprises a coil movable within a fixed magnetic field, the direction and speed of the coil movements being controlled by the motor current signals supplied by a control unit 129.

During operation, the rotation of the magnetic disk 112 generates an air bearing between the slider 113 and the disk surface 122 which exerts an upward force or lift on the slider 113. The air bearing thus counter-balances the slight spring force of the suspension 115 and supports slider 113 off and slightly above the disk 112 surface by a small, substantially constant spacing during normal operation.

The various components of the disk drive 100 are controlled in operation by control signals generated by control unit 129, such as access control signals and internal clock signals. Typically, the control unit 129 comprises logic control circuits, storage, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2A:
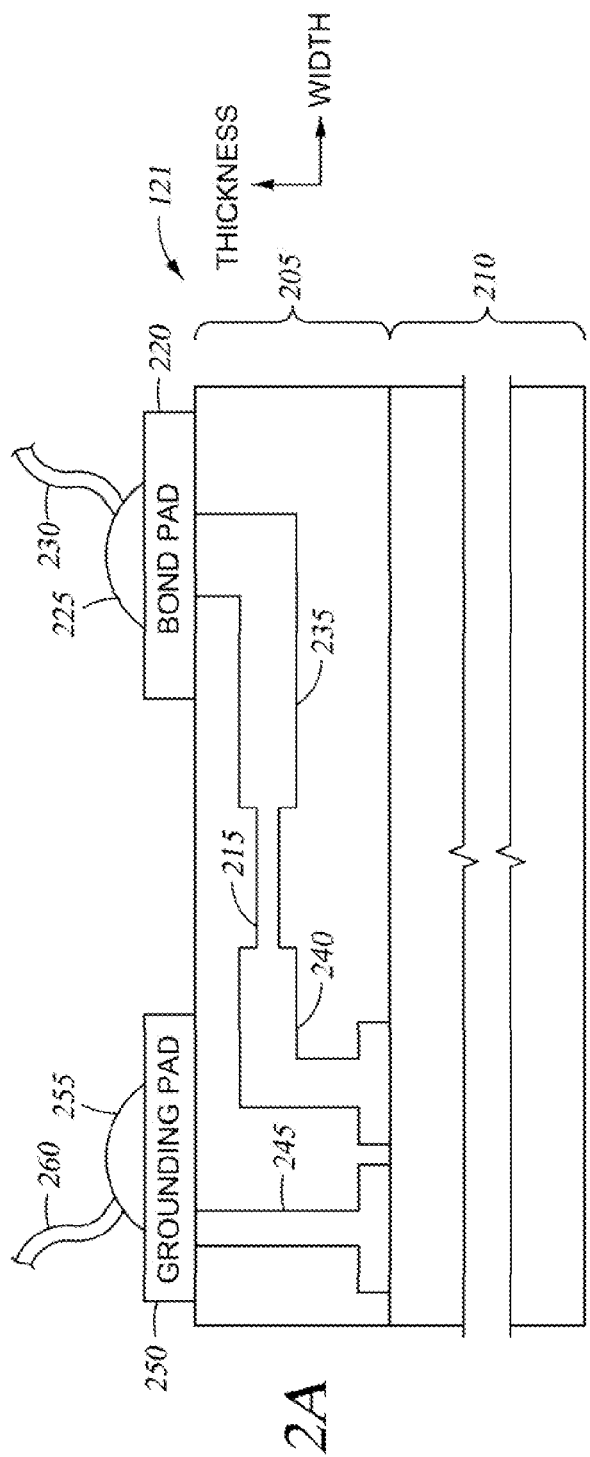
FIGS. 2A-2B illustrate a portion of a read head with an ELG for setting a stripe height, according to certain embodiments described herein.
Figure 2B:
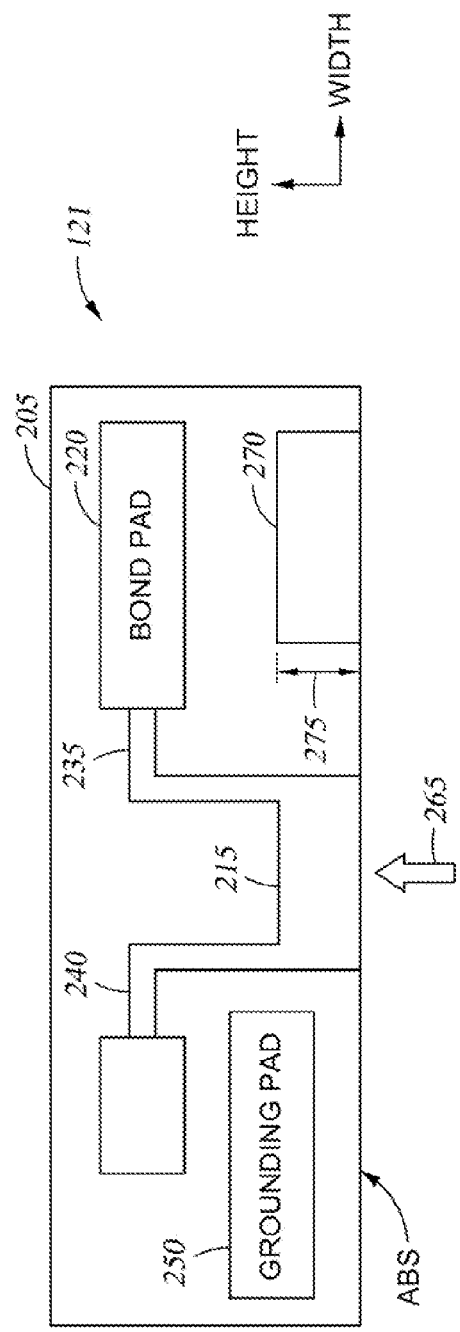

FIGS. 2A-2B illustrate a portion of a read head with an ELG for setting a stripe height, according to embodiments described herein. FIG. 2A illustrates a portion of the magnetic head assembly 121 where the assembly 121 includes a portion of a read head 205 and a conductive substrate 210. The read head 205 includes a plurality of different layers that may be used to form, for example, a plurality of shield layers and a read sensor (not shown). The read sensor may be a magnetoresistive sensor such as giant magnetoresistance (GMR)

sensor or a tunneling magnetoresistance sensor (TMR) where the electrical resistance of the read sensor is measured to identify a change in magnetic orientation of the magnetic material in the associated disk. For example, the read sensor may be a current-perpendicular-to-the-plane (CPP) GMR sensor or a TMR sensor formed by lapping an ABS.

FIG. 2A illustrates a side view of the magnetic assembly 121 where other elements of the read head 205 are omitted. Specifically, FIG. 2A illustrates only the components used in the assembly 121 to connect an ELG 215 to an electrical circuit. A lapping controller (not shown) may be electrically coupled to the ELG 215 by connecting a conductive wire (e.g., gold or copper wire, or other highly conductive material) to a bonding pad 220. The connective material 225 (e.g., a melted portion of a bond wire, a solder bump, conductive paste/epoxy, ultrasonic bonding, and the like) may be used to physically and electrically couple the wire 230 to the pad 220. A first internal lead 235 connects the bonding pad 220 to a first side of the ELG 215 thereby electrically connecting the ELG to an external lapping controller. A second internal lead 240 connects a different side of the ELG 215 to the conductive substrate 210 (e.g., titanium carbide/alumina, or other suitable conductive material). The read head 205 may include a third internal lead 245 that connects the substrate 210 to the grounding pad 250. In one embodiment, the second internal lead 240 and third internal lead 245 may be combined into the same lead. Like the bonding pad 220, the grounding pad 250 may also be connected to the lapping controller using connective material 255 and a conductive wire 260. In this manner, the lapping controller may use a voltage source to provide a potential difference between the grounding pad 250 and the bonding pad 220 which generates a current through the ELG 215. Alternatively, the lapping controller may source a current between the pads 250 and 220 and measure the resulting potential difference.

FIG. 2B illustrates a top view of the read head 205. The arrow 265 illustrates a direction where the ELG 215 is polished during the lapping process. That is, arrow 265 illustrates an exterior surface of the ELG 215 that is formed into an ABS by the lapping process. During this process, the surface of the ELG 215 on the ABS is lapped or polished by an abrasive surface which decreases one or more physical dimensions of the ELG 215. As a physical dimension of the ELG 215 (e.g., its height) is decreased by the lapping process, the current flowing through the ELG 215, and thus, the resistance of the ELG 215 is changed. Decreasing the size of the ELG 215 reduces the amount of area in which the current can flow, thereby increasing the electrical resistance. The lapping controller measures the resistance based on the current flowing through the ELG 215 and determines a corresponding stripe height 275 based on the resistance. For example, assume that the ELG 215 is 6 μm wide, 10 nm thick, and 100 nm tall. These dimensions may correspond to a measured resistance of 250 ohms (Ω). However, after performing the lapping process, the ELG 215 is 6 μm wide, 10 nm thick, and only 50 nm tall which may correspond to a resistance of 500Ω. The lapping controller may be preconfigured to contain a data structure that correlates a measured resistance to the physical dimensions of the ELG 215. Although the embodiments presented herein discuss lapping as the chosen method for forming the ABS and setting the stripe height 275, other planarization techniques may be used to set the stripe height 275.

FIG. 2B also illustrates a read sensor 270 in the read head 205 which is not shown in FIG. 2A. The read sensor 270, like the ELG 215, may include an exterior surface on the ABS which is polished by the lapping process as shown by arrow 265 and may have the same physical dimension as the ELG 215 and related locations in the read head 205, such as being co-planar. The ELG 215 may include a plurality of materials that are similar to the materials in a read sensor in the read head 205. However, the ELG 215 may be fabricated differently from the read sensor such that the ELG 215 generates a signal during lapping that can be used by the lapping controller to identify the resistance of the ELG 215. In contrast, if the lapping controller were connected to the read sensor 270 during the lapping process, the electrical properties of the materials in the read sensor 270 (or the arrangement of those materials) prevent the lapping controller from accurately identifying the resistance of the read sensor 270. Specifically, in some embodiments, the structure of the read sensor 270 may be prone to smearing shunts during lapping, and thus, is unsuitable for controlling the lapping process. By fabricating the ELG 215 to include the similar materials as well as similar physical dimensions as the read sensor 270, both the ELG 215 and the read sensor 270 are similarly changed during the lapping process. Thus, the ELG 215 may serve as a proxy to the read sensor 270 where the height or the resistance of the ELG 215 is imputed to the read sensor 270. That is, either the height or the resistance of the ELG 215 may be used to derive the current stripe height 275 of the read sensor 270.

In other embodiments, the grounding pad 250 may not be connected to the lapping controller. For example, the lapping controller may instead connect to the substrate 210 at a portion of the top surface of the substrate 210 that is not covered by the read head 205. This may enable an electrical connection from the lapping controller and the substrate 210 with less electrical resistance because the third internal lead 245 and the grounding pad 250 may be omitted or substituted by electrical elements with smaller resistances.

The embodiments disclosed herein, however, are not limited to any particular type or method of fabricating the ELG 215. Indeed, the present embodiments may use any ELG 215 so long as the ELG 215 can be used to derive the stripe height 275.

Figures 3A, 3B:
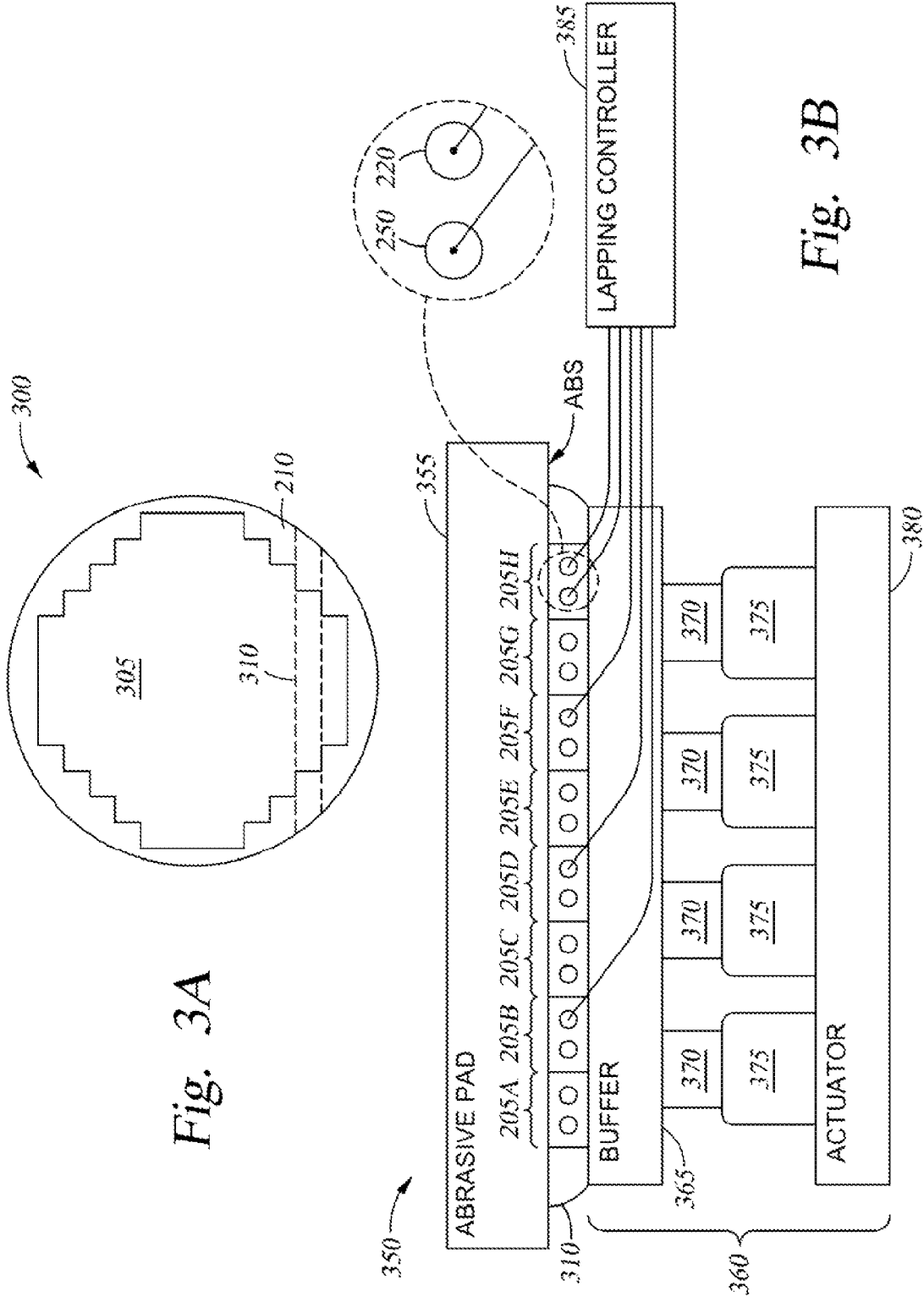
FIG. 3A illustrates a wafer with a plurality of read heads, according to certain embodiments described herein.
FIG. 3B illustrates lapping a row of read heads based on a measured resistance of one or more ELGs, according to certain embodiments described herein.

FIG. 3A illustrates a wafer 300 with a plurality of read heads 305 formed thereon. The wafer 300 includes a substrate 210 that is processed to include the plurality of read heads 305. For example, a single wafer 300 may include hundreds of different read heads 305 with individual ELGs and read sensors. In certain embodiments, 60 read heads 305 may be utilized. Before lapping the read heads 305 to set the stripe height of the read sensors, the wafer 300 may be cleaved or diced (using a saw) into individual rows. The ghosted portion illustrates a row 310 of the read heads 305 that may be separated from the rest of the read heads 305.

FIG. 3B illustrates lapping a row 310 of read heads based on a measured resistance of one or more ELGs, according to one embodiment described herein. The row 310 diced from the wafer 300 shown in FIG. 3A is mounted into the lapping system or unit 350. As shown, the row 310 includes a plurality of read heads 205A-205H. Only eight read heads are shown, but the number of read heads per each row may vary depending on the particular portion of the wafer the row was diced from. Accordingly, each row 310 may include only one read head or even one hundred or more read heads. Each read head 205A-205H may include two external bonding pads: a grounding pad 250 and a bonding pad 220. Although each read head 205A-205H includes both types of pads, in other embodiments only certain read heads may have grounding pads 250 (e.g., only the read heads 205A and 205H at the end of the row 310. Additionally or alternatively, only a subset of the read heads 205A-205H in a row 310 may have bonding pads 250. Regardless of how the pads 220, 250 are distributed amongst the different read heads 250A-205H, the bonding pads 220 connect to one side of an ELG in the sensor heads 250A-205H while the grounding pads 250 provide a connection to the substrate 210 of the row 310.

The lapping system 350 may include an abrasive pad 355, a force system 360, and a lapping controller 385. The abrasive pad 355 may include one or more separate pads that rub against the ABS of the read heads 205A-205H, thereby removing portions of the ABS and reducing the height of the read sensors as shown in FIG. 2B. The abrasive pad 355 may be an abrasive material such as diamond particles, aluminum oxide, or silicon carbide that grinds or laps away the portion of the read heads 205A-205H that the pad 355 contacts. Alternatively, the abrasive pad 355 may be a softer material such as tin that is "charged" with an abrasive to lap the ABS.

The force system 360 may include an actuator 380, pistons 375, rods 370, and a buffer 365. The actuator 380 is communicatively coupled to the lapping controller 385 and receives instructions for separately controlling the respective pistons 375. As such, the actuator 380 may use the pistons 375 to determine how much force to apply to different portions of the row 310. The pistons 375 may be electrically, magnetically, pneumatically, or hydraulically controlled to apply a specified pressure or force to the buffer 365. The buffer 365, a semi-flexible material such as polyurethane, may transfer the force to a respective portion of the row 310. By increasing the force applied by a particular piston 375, the actuator 380 controls the rate at which the abrasive pad 355 grinds a read head or group of read heads 205. Here, each piston 375 is associated with two read heads 205A-205H although each piston 375 may be assigned to more or less read heads. If the actuator 380 is informed by the lapping controller 385 that some subset of the read heads 205A-205H are being lapped at a different rate by the abrasive pad 355 relative to another portion, then the actuator 380 can adjust the associated pistons 375 to correct the imbalance.

The lapping controller 385 (e.g., a printed circuit board or other logic containing computing element) may be used to determine the lap rate of the different read heads 205A-205H and instruct the actuator 380 to correct any imbalance or stop the lapping process when the desired stripe height is achieved. As shown, the lapping controller 385 may be electrically coupled (e.g., wire bonded) to every other read head in the row 310, i.e., read heads 205B, 205D, 205F, and 205H, using the bonding pads 220. However, the lapping controller 385 may be coupled to more or less than this ratio. In one embodiment, the lapping controller 385 may be coupled to as many read heads as there are pistons 375 in the actuator 380. That is, the lapping system 350 may designate one of the read heads associated with a piston 375 as the representative head (e.g., read heads 205B, 205D, 205F, or 205H) which is coupled to the lapping controller 385. The resistance of the ELG in the representative read head is then measured and used by the lapping controller 385 to control the associated piston 375. However, to improve control, in other embodiments the lapping controller 385 may be coupled to two or more of the read heads 205 associated with a single piston 375 and control the piston 375 based on measuring the resistance of both of the ELGs in the two or more heads. For example, the lapping controller 385 may average the measured resistances of the ELGs and use the average resistance to derive the stripe height and control the piston pressure.

When lapping, the lapping controller 385 may iteratively apply a voltage or source a current to each connected read head 205B, 205D, 205F, and 205H using the respective bonding pads 220 and the grounding pad 250 of read head 205H. Because the connected read heads 205B, 205D, 205F, and 205H share the same ground connection, the lapping controller 385 may measure the resistances of the ELGs in each of the read heads 205B, 205D, 205F, and 205H sequentially during non-overlapping intervals. Based on the measured resistances, the lapping controller 385 sends adjustment instructions to the actuator 380 for changing the pressure applied by the pistons 375. For example, if the resistance associated with read head 205H is greater than the resistances of the other read heads coupled to the lapping controllers 385, the actuator 380 may reduce the pressure applied by the actuator 380 associated with read head 205H (or increase the pressure applied by the pistons 375 associated with the other read heads 205B, 205D, and 205F).

Figure 4A:
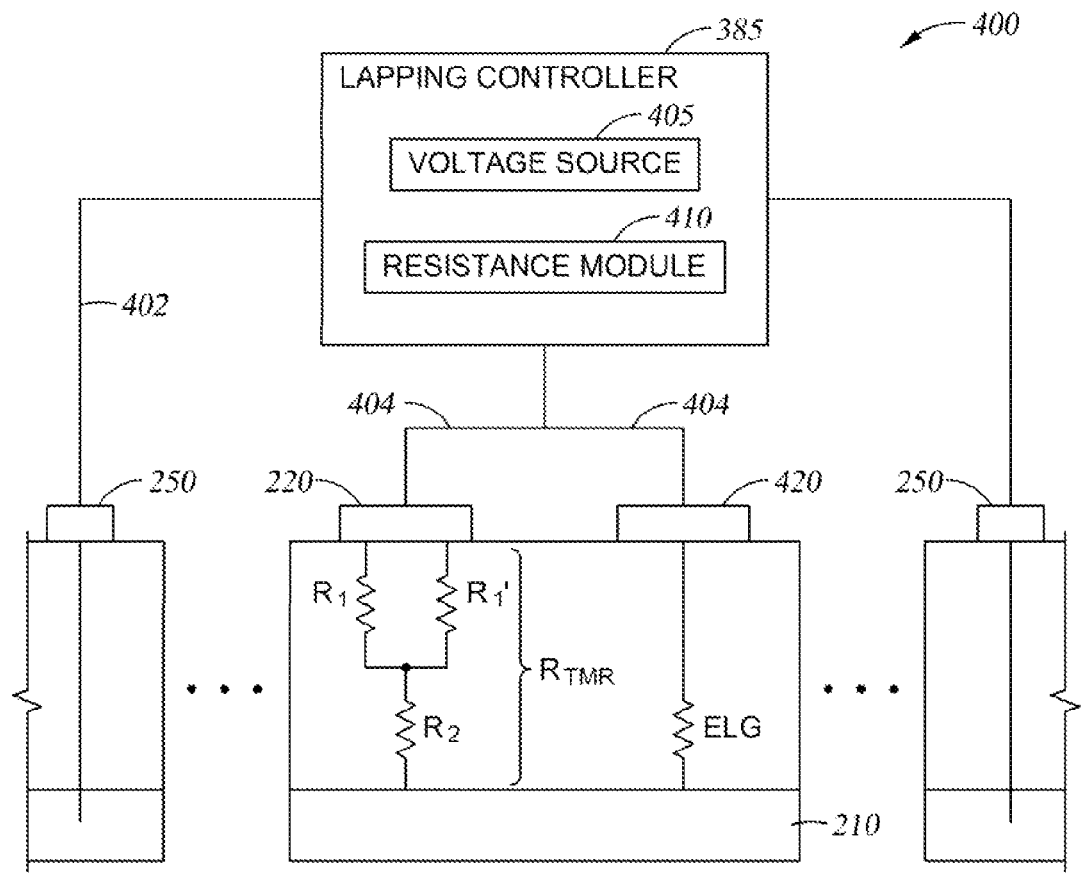
FIGS. 4A-4B illustrate schematic circuit model diagrams of an electrical circuit that includes the substrate on which the read sensor is disposed, according to certain embodiments described herein.
Figure 4B:
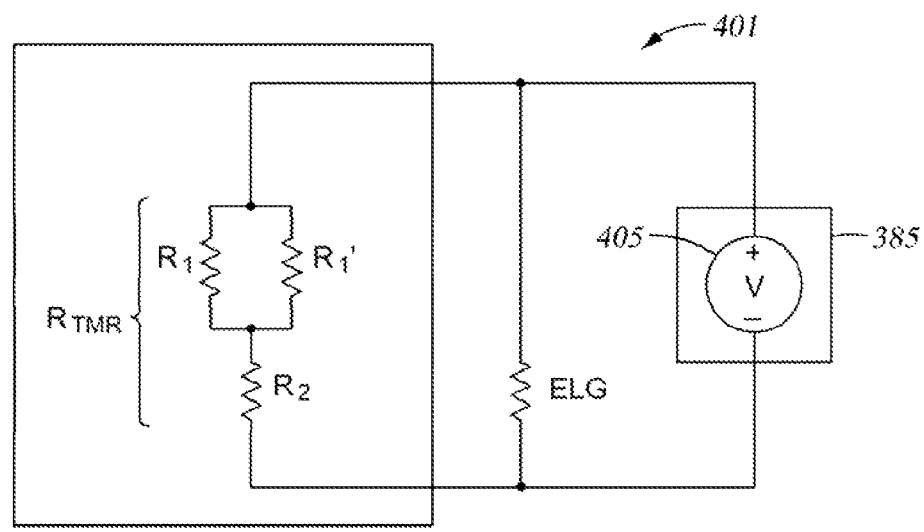

FIGS. 4A-4B illustrate schematic circuit model diagrams of an electrical circuit that includes the substrate 210 on which the read head is disposed, according to embodiments described herein. Specifically, FIG. 4A illustrates a circuit model 400 for a row of read heads, however, for clarity, the connections between other read heads in the row and the lapping controller 385 have been omitted. The circuit model 400 includes two ground connections 402 for connecting the lapping controller 385 to the substrate 210 via two different grounding pads 250. The lapping controller 385 includes a voltage source 405 which provides a voltage potential between the grounding pads 250 and the bonding pad 220, such as a component bonding pad. The voltage potential results in current flowing between the pads 220, 250 and through the element (i.e. TMR element) which is here modeled as a bleed resistor network $R_{TMR}$.

The ELG is also present on the substrate 210 and an ELG bond pad 420 is coupled to the controller 385 by an ELG bond 404. Although the ELG bond 404 is intended to connect the ELG bond pad 420 and the lapping controller 385, the ELG bond 404 may inadvertently touch the bonding pad 220 which may result in an error measurement during the lapping process.

The resistive network $R_{TMR}$ may comprise one or more resistors, such as resistors $R_1$, $R_{1'}$, and $R_2$. Resistor $R_1$ and resistor $R_{1'}$ may be arranged in parallel to each other and may exhibit substantially equal impedance. The impedance of each of resistor $R_1$ and resistor $R_{1'}$ may be between about 5 KOhms and about 50 KOhms, such as about 20 KOhms. For example, the element may be shunted by approximately 40 KOhms which may be the combined impedance of resistor $R_1$ and resistor $R_{1'}$. Resistor $R_2$ may be arranged in series with resistors $R_1$ and $R_{1'}$. Resistor $R_2$ may have an impedance of between about 250 KOhms and about 750 KOhms, such as about 510 KOhms. The $R_{TMR}$ circuit 400 may provide for the element's resistance to the substrate 210 being dominated by resistor $R_2$. As such, the element may not be shunted by resistors $R_1$ and $R_{1'}$. In certain embodiments, the circuit 400 may be referred to as a series-parallel-shunt (SPS). The SPS design may occupy a lesser physical area compared to conventional circuit designs, which may allow for even smaller elements and associated lapping guides.

FIG. 5A depicts a bleed resistor network layout according to certain embodiments described herein. As previously described, resistors $R_1$ and $R_{1'}$ are arranged in parallel with one another and resistor $R_2$ is arranged in series with resistors $R_1$ and $R_{1'}$. The $R_1$ and $R_{1'}$ are coupled via bonds 504 to the element, such as the reader, and the resistor $R_2$ is coupled to the substrate 210, more precisely, a slider 500, via a bond 502. The physical area occupied by the bleed resistor network on the slider 500 is substantially reduced when compared to a conventional bleed resistor network, such as the bleed resistor network shown in FIG. 5B. For example, the conventional bleed resistor network of FIG. 5B requires two resistors in parallel with one another and each resistor may provide an impedance of 1 MOhm. Each resistor is coupled via bond 504 to the element and the resistor network requires two bonds 502 for connection to the slider 500 As may be seen, the physical area required to form two 1 MOhm resistors is substantially greater than the area required by the bleed resistor network of FIG. 5A utilizing the SPS arrangement.

Referring back to FIG. 4A, the voltage source 405 may transmit DC signals, AC signals, or some combination of both. When transmitting an AC signal, the voltage source 405 may use any type of waveform such as square, sinusoidal, sawtooth, and the like. The resistance module 410 may be coupled to the voltage source 405 such that the module 410 is informed of the voltage being applied in the circuit 400. Based on a measured current or a measured voltage if a current source is used, the resistance module 410 may then derive the value of the ELG. However, the ELG value may be distorted by the parallel shunting of the $R_{TMR}$. FIG. 4B illustrates a simplified circuit model 401 where the voltage source 405 is coupled to a particular ELG, and inadvertently to the element (read head) in the row 310. A positive side of the voltage source 405 is shown connected to $R_{TMR}$ while a negative side of the voltage source 405 is coupled to a common ground node, such as the substrate 210. As shown, the total resistance of the bleed resistor network $R_{TMR}$ ($R_1/R_{1'}$ in parallel with $R_2$ in series—SPS shunt) is much greater relative to the resistance of the ELG. Thus, it is believed that the measured resistance is dominated by the resistance of the ELG and the inadvertent ELG-sensor bonding overlap will not create substantial error in the lapping measurement.

Embodiments described herein generally relate to an ELG circuit design lapping having an SPS arrangement with a relatively small layout area requirement. When lapping the ABS of a read head (or a plurality of read heads), the electrical resistance of the ELG is used to adjust the lapping process and set the stripe height for a read sensor in the read head. Specifically, as an exterior surface of the ELG at the ABS is lapped, the resistance of the ELG increases. Once the resistance corresponds to the desired stripe height—i.e., the distance between the ABS and the back edge of the read sensor—the lapping process is stopped. The SPS circuit arrangement may provide an equal amount of parallel shunt protection while providing additional resistance to ground to avoid ELG measurement errors. The SPS circuit arrangement also requires less physical area than conventional shunting circuitry for a bleed resistor network.

While the foregoing is directed to embodiments of the present invention, other and further embodiments of the invention may be devised without departing from the basic scope thereof, and the scope thereof is determined by the claims that follow.

What is claimed is:

1. A bleed resistor network for a read sensor, comprising:
   two first resistors connected in parallel with one another, wherein each of the first resistors have a substantially equal impedance of greater than about 5 KOhms; and
   a second resistor arranged in series with the two first resistors, wherein the second resistor has an impedance of greater than about 250 KOhms.

2. The bleed resistor network of claim 1, wherein the impedance of each first resistor is about 20 KOhms.

3. The bleed resistor network of claim 2, wherein the impedance of the second resistor is about 510 KOhms.

4. The bleed resistor network of claim 1, wherein the combined impedance of the two first resistors is about 40 KOhms.

5. A device, comprising:
   a substrate; and
   a plurality of read heads disposed on the substrate, a first one of the plurality of read heads comprising:
      a read sensor having a bleed resistor network, the bleed resistor network comprising:
         two first resistors in parallel with one another, wherein each of the first resistors have a substantially equal impedance of greater than about 5 KOhms;
         a second resistor arranged in series with the two first resistors, wherein the second resistor has an impedance of greater than about 250 KOhms; and
      an electronic lapping guide (ELG) configured to indicate, based on a resistance of the ELG, a stripe height of the read sensor.

6. The device of claim 5, wherein the impedance of each first resistor is about 20 KOhms.

7. The device of claim 6, wherein the impedance of the second resistor is about 510 KOhms.

8. The device of claim 5, wherein the combined impedance of the two first resistors is about 40 KOhms.

9. The device of claim 5, wherein the plurality of read heads are arranged in a row on the substrate.

10. The device of claim 5, wherein the substrate comprises alumina or titanium carbide.

11. The device of claim 10, wherein the read sensor comprises a tunneling magnetoresistance sensor or a giant magnetoresistance sensor.

12. The device of claim 5, wherein the read sensor comprises a tunneling magnetoresistance sensor or a giant magnetoresistance sensor.

13. A system, comprising:
   a substrate comprising a plurality of read heads, each read head comprising:
      a read sensor configured to sense data stored in a magnetic media, wherein a bleed resistor network of the read sensor comprises:
         two first resistors in parallel with one another, wherein each of the first resistors have a substantially equal impedance of greater than about 5 KOhms;
         a second resistor arranged in series with the two first resistors, wherein the second resistor has an impedance of greater than about 250 KOhms;
      an ELG configured to indicate, based on a resistance of the ELG, a stripe height of the read sensor, wherein the ELG is electrically coupled to the substrate; and
      a bonding pad electrically coupled to the ELG, wherein the bonding pad, the ELG, and the substrate are part of a current path permitting current to flow through the ELG;
   a lapping unit configured to simultaneously lap an air bearing surface on the plurality of read heads, wherein the substrate is mounted on the lapping unit; and
   a lapping controller electrically coupled to the bonding pad and the substrate, the lapping controller configured to measure the resistance of the ELG using the current path and transmit instructions to the lapping unit based on the measured resistance.

14. The system of claim 13, wherein the impedance of each first resistor is about 20 KOhms.

15. The system of claim 14, wherein the impedance of the second resistor is about 510 KOhms.

16. The system of claim 13, wherein the combined impedance of the two first resistors is about 40 KOhms.

17. The system of claim 13, wherein the plurality of read heads are arranged in a row on the substrate.

18. The system of claim 13, wherein the substrate comprises alumina or titanium carbide.

19. The system of claim 18, wherein the read sensor comprises a tunneling magnetoresistance sensor or a giant magnetoresistance sensor.

20. The system of claim 13, wherein the read sensor comprises a tunneling magnetoresistance sensor or a giant magnetoresistance sensor.

* * * * *